L. C. Witt & W. F. Jones.
Fender for Corn Plows.
Nº 96293.     Patented Oct. 26. 1869.
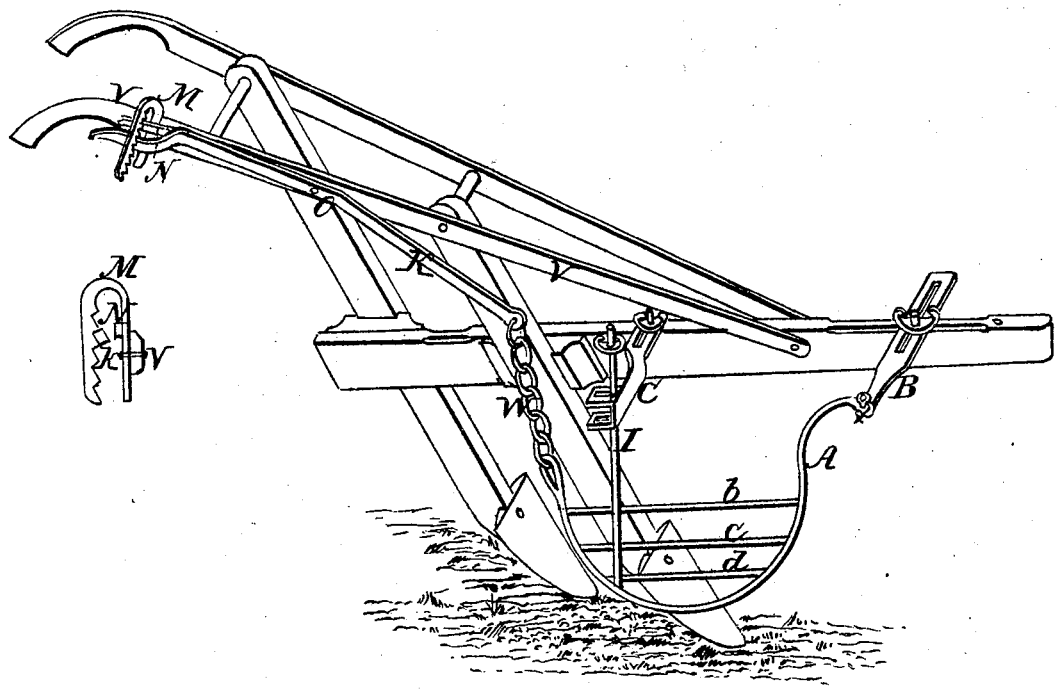
Witnesses;
J. N. Haynes
Sam G. Estell
Inventor;
Lewis C. Witt
W. F. Jones
Per A. Roberts Atty

UNITED STATES PATENT OFFICE.

LEWIS C. WITT AND W. F. JONES, OF BOSTON, INDIANA.

IMPROVEMENT IN FENDERS FOR CORN-PLOWS.

Specification forming part of Letters Patent No. 96,293, dated October 6, 1869.

*To all whom it may concern:*

Be it known that we, LEWIS C. WITT and W. F. JONES, of Boston, in the county of Wayne and State of Indiana, have invented an Improved "Fender" for Corn-Plows; and we do hereby declare the following to be full and exact description thereof, reference being had to the accompanying drawings, making a part of this specification.

Our invention consists in certain devices, by means of which the fender may readily be adjusted laterally to suit shovels of different sizes, and vertically in passing obstructions, or to allow more or less earth to fall beneath it, as may be required at various stages of growth of the crop. The conformation of the fender is believed to be novel, and to possess advantages in the way of neatness, strength, and economy of construction.

In the accompanying drawings similar letters refer to corresponding parts.

The fender is made of light round or oval rods of iron, the outer one, A, being bent in the form of a semicircle, and the three horizontal rods *b c d* welded or riveted thereto. The forward end of the rod A is extended in a reverse curve, and the extremity is flattened and punched to receive one end of the slotted bar B. The vertical rod I is secured to the fender, and extends upward through two elongated openings in ears projecting from the side of the slotted bar C. The two slotted bars B and C are attached to the plow-beam by means of bolts and thumb-screws, that may readily be loosened, and the bars extended more or less from the beam, thus providing for an accurate adjustment of the fender to suit varying conditions of the soil and crop or the shovels to be used. By the use of two slotted bars, as described, the fender may always be adjusted in a line parallel with the direction of the plow, thus preventing a dragging or side motion. The rear end of bar A is attached to a chain, W, that allows the fender to rise over obstructions, while the rod I serves to retain it in a vertical position. One end of the chain W is attached to the lever K, that is pivoted at O, and extends along the handle of the plow, as shown in the drawings, the upper end being bent out from the handle V, and slightly beveled, so as to engage with a ratchet on the inner surface of the curved bar M, against which it is held by the spring N, that presses against the plow-handle V.

Having thus fully described our said invention, what we claim, and desire to secure by Letters Patent, is—

1. A fender constructed in the manner described, in combination with the two slotted bars B and C, the vertical rod I, and chain W, the whole being arranged and operated substantially as herein set forth.

2. In combination with the fender, as described, the lever K, ratchet-bar M, and spring N, the whole being constructed and operated substantially as set forth.

In testimony whereof we have hereunto set our hands.

LEWIS C. WITT.
W. F. JONES.

Witnesses:
J. N. HAYNES,
ARTEMAS ROBERTS.